United States Patent
Wu et al.

(10) Patent No.: US 9,971,092 B2
(45) Date of Patent: May 15, 2018

(54) POLARIZATION SCRAMBLER BASED ON FIBER WAVE PLATES

(71) Applicants: Beijing Qi-Red PhotoElectric Technology Co., Ltd., Beijing (CN); Zibo Qi-Red PhotoElectric Technology Co.,Ltd., Beijing (CN)

(72) Inventors: Shudong Wu, Beijing (CN); Wenbo Wang, Beijing (CN)

(73) Assignees: Beijing Qi-Red PhotoElectric Technology Co., Ltd., Beijing (CN); Zibo Qi-Red PhotoElectric Technology Co., Ltd., Beijing (CN)

( * ) Notice: Subject to any disclaimer, the term of this patent is extended or adjusted under 35 U.S.C. 154(b) by 0 days. days.

(21) Appl. No.: 15/605,478

(22) Filed: May 25, 2017

(65) Prior Publication Data
US 2017/0261690 A1  Sep. 14, 2017

(51) Int. Cl.
*G02B 6/27* (2006.01)
*G02B 6/024* (2006.01)

(52) U.S. Cl.
CPC ........... *G02B 6/2786* (2013.01); *G02B 6/024* (2013.01)

(58) Field of Classification Search
CPC .............................. G02B 6/274; G02B 6/2786
See application file for complete search history.

(56) References Cited

U.S. PATENT DOCUMENTS

| | | | | |
|---|---|---|---|---|
| 5,212,743 A * | 5/1993 | Heismann | ............ | G02F 1/0353 359/484.01 |
| 6,233,371 B1 * | 5/2001 | Kim | ....................... | G02B 6/105 372/105 |
| 6,396,965 B1 * | 5/2002 | Anderson | ............. | G02B 6/105 356/365 |

* cited by examiner

Primary Examiner — Omar R Rojas

(57) ABSTRACT

A polarization scrambler based on fiber wave plates is disclosed. A λ/4 unit (2) is connected between a first polarization control unit (1) and a second polarization control unit (3) through single-mode fibers; a first motor (11) of the first polarization control unit (1) and a second motor (31) of the second polarization control unit (3) simultaneously forwardly and reversely swing in the range of +/−90°, such that polarization states in the system constantly change, for achieving the purpose of polarization disturbance. The polarization scrambler based on fiber wave plates provided by the present invention has low loss, good effect, low cost and simple structure, and is convenient for manufacturing. Its speed is up to milliseconds to meet demands of most optical fiber sensing systems and optical fiber communicating systems.

4 Claims, 2 Drawing Sheets

POLARIZATION SCRAMBLER BASED ON FIBER WAVE PLATES

CROSS REFERENCE OF RELATED APPLICATION

The present invention claims priority under 35 U.S.C. 119(a-d) to CN 201710057496.X, filed Jan. 26, 2017.

BACKGROUND OF THE PRESENT INVENTION

Field of Invention

The present invention relates to the field of polarization optical fiber sensing technology, and more particularly to a polarization scrambler based on fiber wave plates.

Description of Related Arts

The polarization scrambler is mainly used for any optical systems which are sensitive to the polarization states and unable to control the polarization states thereof. The purpose of the polarization scrambler is to rapidly change the polarization state of the system, so as to achieve the average polarization of the data, thereby improving the signal to noise ratio of the system. America Agiltron Company (MA, USA), and China Suzhou Bonphot Optoelectronics Co., Ltd adopt E-O crystal wave plates, whose principle is that apply a high voltage to control the phase shift of the wave plate and speed can reach the order of ten nanoseconds. America General Photonics Corporation (CA, USA) developed an all-fiber polarization scrambler, which uses single-mode fibers under stress to change the polarization state; the stress is applied to the SM fibers in the form of PZT at a velocity in the order of microseconds. However, the above two kinds of polarization scramblers are expensive.

SUMMARY OF THE PRESENT INVENTION

The present invention provides a polarization scrambler which is simple in manufacture, low in cost and good in effect, and is adapted for any optical fiber sensing and optical fiber communicating systems which are sensitive to the polarization states and unable to control the polarization states thereof.

The polarization scrambler is achieved by rapidly swinging two fiber wave plates. Every fiber wave plate is made from a section of polarization-maintaining fiber, two λ/2 fiber wave plates are respectively installed within a hollow shaft of two motors; through the forward and backward quick rotation of the two motors, the polarization direction of light is changed, thus achieving the purpose of polarization disturbance.

The present invention provides a polarization scrambler based on fiber wave plates, comprising a first polarization control unit, a λ/4 unit, and a second polarization control unit, wherein the λ/4 unit is connected between the first polarization control unit and the second polarization control unit through single-mode fibers; the first polarization control unit comprises a first motor with a hollow shaft and a first λ/2 fiber wave plate; the first λ/2 fiber wave plate is fixed within the hollow shaft of the first motor; the second polarization control unit comprises a second motor with a hollow shaft and a second λ/2 fiber wave plate; the first polarization control unit and the second polarization control unit are same in structure; the λ/4 unit comprises a λ/4 fiber wave plate; all the three fiber wave plates are made from a section of polarization-maintaining fiber.

When the two motors of the first polarization control unit and the second polarization control unit rotate forwardly and reversely, the polarization state in the system constantly changes, so as to achieve the purpose of polarization disturbance.

Both the two motors forwardly and reversely rotate within a range of +/−90°, rotational frequencies f1 and f2 of the two motors meet a formula of f1−f2=1/T, wherein f1 is the rotational frequency of the first motor with the hollow shaft, f2 is the rotational frequency of the second motor with the hollow shaft, T is an average time of the system.

The present invention has advantages as follows.

1. Low cost. The present invention is able to be manufactured by components which are low in cost in the market.

2. Simple structure. There is no complicated mechanical structure.

3. Low loss. The present invention is a polarization scrambler based on fiber wave plates, so the insertion loss is low.

4. Small volume. The present invention is able to adopt the pocket motor.

5. Good effect. Its speed is up to milliseconds to meet demands of most optical fiber sensing systems or optical fiber communicating systems.

6. Compact structure. The motors with the hollow shaft are adopted to allow the fiber space caused by the rotation of the motor to move minimally.

These and other objectives, features, and advantages of the present invention will become apparent from the following detailed description, the accompanying drawings, and the appended claims.

BRIEF DESCRIPTION OF THE DRAWINGS

In order to more clearly illustrate the present invention and the technical solutions, the drawings, which are to be used in the description of the embodiments or the prior arts, are briefly described as below. It will be apparent that the drawings in the following description are merely exemplary of the present invention and that other drawings may be obtained by those skilled in the art without departing from the inventive work.

DETAILED DESCRIPTION OF THE PREFERRED EMBODIMENT

Figure 1:
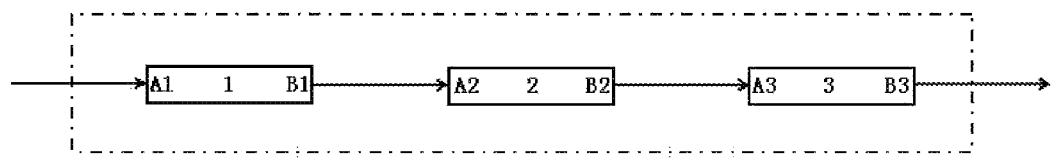
FIG. 1 is a structural diagram of a polarization scrambler based on fiber wave plates according to a preferred embodiment of the present invention.

Referring to FIG. 1 of the drawings, a polarization scrambler based on fiber wave plates according to a preferred embodiment of the present invention is illustrated, comprising a first polarization control unit 1, a λ/4 unit 2, and a second polarization control unit 3. The first polarization control unit 1 comprises a first motor 11 and a first λ/2 fiber wave plate 12. The first λ/2 fiber wave plate 12 is fixed inside a hollow shaft 111 of the first motor 11. The λ/4 unit 2 is a λ/4 fiber wave plate 2. The second polarization control unit 3 comprises a second motor 31 and a second λ/2 fiber wave plate 32. All the three fiber wave plates are made from a section of polarization-maintaining fiber.

The λ/4 unit 2 is connected between the first polarization control unit 1 and the second polarization control unit 3 through single-mode fibers.

In the present invention, the first polarization control unit 1 and the second polarization control unit 3 are same in structure.

In the present invention, the first λ/2 fiber wave plate 12 and the second λ/2 fiber wave plate 32 are same in structure.

The connection between the components is as follows. The first λ/2 fiber wave plate 12 of the first polarization control unit 1 is fixed inside the hollow shaft 111 of the first motor 11; an input end of the polarization scrambler is connected with an input end A1 of the first λ/2 fiber wave plate 12 through single-mode fibers; an output end B1 of the first λ/2 fiber wave plate 12 is connected with an input end A2 of the λ/4 fiber wave plate 2 through single-mode fibers; an output end B2 of the λ/4 fiber wave plate 2 is connected with an input end A3 of the second λ/2 fiber wave plate 32 of the second polarization control unit 3; an output end B3 of the second λ/2 fiber wave plate 32 is connected with the system.

Figure 2A:
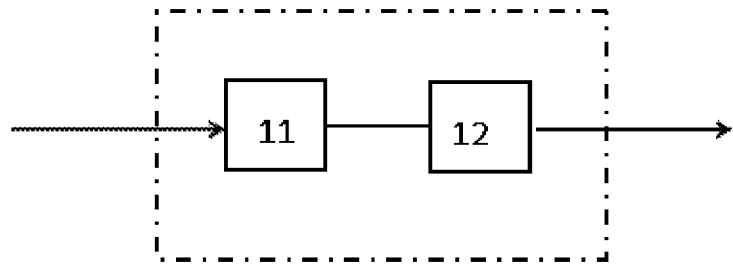
FIG. 2A is a structural diagram of a first polarization control unit according to the above preferred embodiment of the present invention.

As shown in FIG. 2A, the first polarization control unit 1 comprises the first motor 11 and the first λ/2 fiber wave plate 12, the first λ/2 fiber wave plate 12 is fixed within the hollow shaft 111 of the first motor 11, a polarization direction of the system is changed by the rotation of the first motor 11 so as to achieve the purpose of polarization disturbance.

Figure 2B:
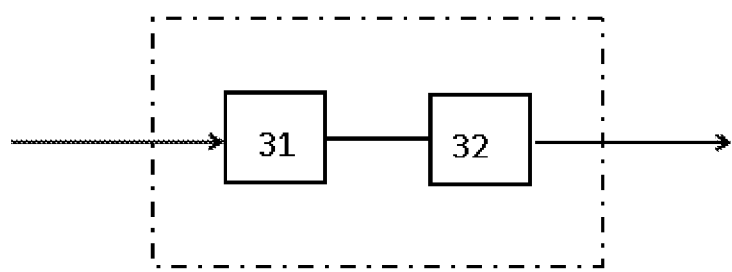
FIG. 2B is a structural diagram of a second polarization control unit according to the above preferred embodiment of the present invention.

As shown in FIG. 2B, the second polarization control unit 3 and the first polarization control unit 1 are same in structure; in order to make the polarization state within the system more comprehensive and more uniform distribution, the two motors need to rotate at the same time.

Figure 3A:
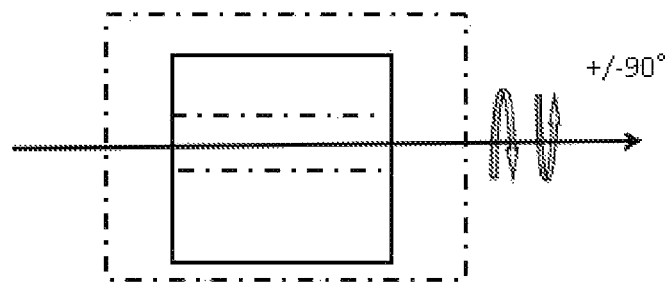
FIG. 3A is a working principle diagram of the first polarization control unit according to the above preferred embodiment of the present invention.
Figure 3B:
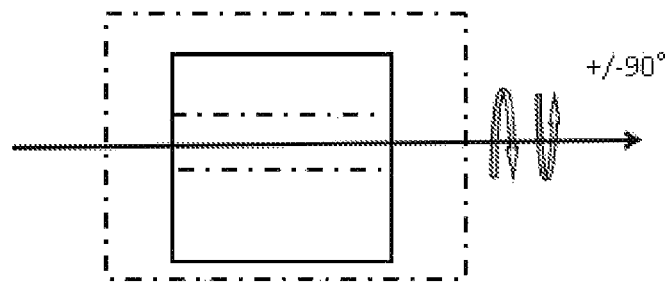
FIG. 3B is a working principle diagram of the second polarization control unit according to the above preferred embodiment of the present invention.

Referring to FIGS. 3A and 3B, both the first motor 11 of the first polarization control unit 1 and the second motor 31 of the second polarization control unit 3 forwardly and reversely swing within a range of +/−90°; when the two motors simultaneously rotate, the output polarization of the system is able to sweep the polarization states in all directions so as to achieve the purpose of uniform polarization disturbance. To achieve the best polarization disturbance effect, rotational frequencies f1 and f2 of the two motors with the hollow shafts 111, 311 meet a formula of f1−f2=1/T, wherein f1 is the rotational frequency of the first motor with the hollow shaft, f2 is the rotational frequency of the second motor with the hollow shaft, T is an average time of the system.

In the present invention, FIG. 3A and FIG. 3B are same in structure.

Figure 4:
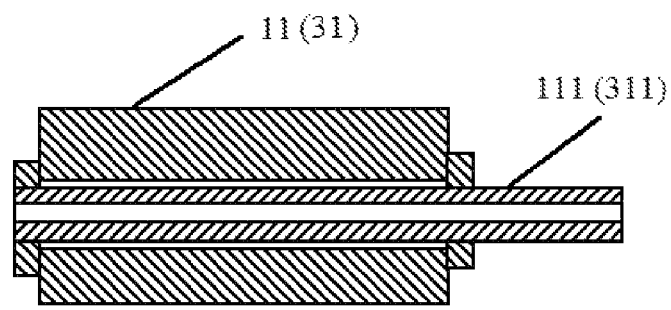
FIG. 4 is a schematic view of a motor having a hollow shaft according to the above preferred embodiment of the present invention.

FIG. 4 is a schematic view of a motor having a hollow shaft according to the preferred embodiment of the present invention, wherein the motor can be the first motor 11 or the second motor 31, and accordingly, the hollow shaft can be the hollow shaft 111 or the hollow shaft 311.

The basic principles, main features and advantages of the present invention have been shown and described above. It should be understood by those skilled in the art that the present invention is not limited by the above-described embodiments, and that the principles described in the foregoing examples and description are illustrative of the principles of the present invention, and that the present invention will be changed and improved without departing from the spirit and scope of the present invention, and that the changes and improvements will fall within the scope of the present invention as claimed. It is intended that the scope of the present invention be defined by the appended claims and their equivalents.

What is claimed is:

1. A polarization scrambler based on fiber wave plates, comprising:
    a first polarization control unit (1);
    a λ/4 unit (2), and
    a second polarization control unit (3), wherein:
    the λ/4 unit (2) is connected between the first polarization control unit (1) and the second polarization control unit (3) through single-mode fibers;
    the λ/4 unit (2) is a λ/4 fiber wave plate (2);
    an output end (B1) of a first λ/2 fiber wave plate (12) of the first polarization control unit (1) is connected with an input end (A2) of the λ/4 fiber wave plate (2);
    an output end (B2) of the λ/4 fiber wave plate (2) is connected with an input end (A3) of a second λ/2 fiber wave plate (32) of the second polarization control unit (3);
    a first motor (11) of the first polarization control unit (1) and a second motor (31) of the second polarization control unit (3) forwardly and reversely swing to change a polarization direction of light in the polarization scrambler, so as to achieve a purpose of polarization disturbance;
    the two motors (11,31) simultaneously rotate within a range of +/−90°, an output polarization of the polarization scrambler is able to sweep polarization states in all directions so as to achieve a purpose of polarization disturbance; rotational frequencies f1 and f2 of the two motors (11, 31) with two hollow shafts (111,311) meet a formula of f1−f2=1/T, here, f1 is a rotational frequency of the first motor (11) with the hollow shaft (111), f2 is a rotational frequency of the second motor (31) with the hollow shaft (311), T is an average time of the polarization scrambler.

2. The polarization scrambler based on the fiber wave plates, as recited in claim 1, wherein:
    the first polarization control unit (1) comprises the first motor (11) and the first λ/2fiber wave plate (12);
    the first λ/2fiber wave plate (12) is fixed within the hollow shaft (111) of the first motor (11);
    the second polarization control unit (3) comprises the second motor (31) and the second λ/2 fiber wave plate (32);
    the second λ/2 fiber wave plate (32) is fixed within the hollow shaft (311) of the second motor (31);
    the first polarization control unit (1) and the second polarization control unit (3) are same in structure.

3. The polarization scrambler based on the fiber wave plates, as recited in claim 1, wherein:
    the input end (A2) of the λ/4 fiber wave plate (2) is connected with the output end (B1) of the first λ/2 fiber wave plate (12) through single-mode fibers;
    the output end (B2) of the λ/4 fiber wave plate (2) is connected with the input end (A3) of the second λ/2 fiber wave plate (32) through single-mode fibers;
    the first λ/2 fiber wave plate (12) and the second λ/2 fiber wave plate (32) are same in structure;
    all the three fiber wave plates (2, 12, 32) are made from a section of polarization-maintaining fiber.

4. The polarization scrambler based on the fiber wave plates, as recited in claim 2, wherein:
- the input end (A2) of the λ/4 fiber wave plate (2) is connected with the output end (B1) of the first λ/2 fiber wave plate (12) through single-mode fibers;
- the output end (B2) of the λ/4 fiber wave plate (2) is connected with the input end (A3) of the second λ/2 fiber wave plate (32) through single-mode fibers;
- the first λ/2 fiber wave plate (12) and the second λ/2 fiber wave plate (32) are same in structure;
- all the three fiber wave plates (2, 12, 32) are made from a section of polarization-maintaining fiber.

* * * * *